(12) United States Patent
Kim

(10) Patent No.: US 10,758,877 B2
(45) Date of Patent: Sep. 1, 2020

(54) SAMPLE PRETREATMENT MODULE AND PRETREATMENT METHOD USING THE SAME

(71) Applicant: NANOENTEK, INC., Seoul (KR)

(72) Inventor: Yu-Rae Kim, Osan-si (KR)

(73) Assignee: NANOENTEK, INC., Seoul (KR)

( * ) Notice: Subject to any disclaimer, the term of this patent is extended or adjusted under 35 U.S.C. 154(b) by 339 days.

(21) Appl. No.: 15/757,523

(22) PCT Filed: Aug. 30, 2016

(86) PCT No.: PCT/KR2016/009640
§ 371 (c)(1),
(2) Date: Mar. 5, 2018

(87) PCT Pub. No.: WO2017/039279
PCT Pub. Date: Mar. 9, 2017

(65) Prior Publication Data
US 2018/0250645 A1 Sep. 6, 2018

(30) Foreign Application Priority Data

Sep. 4, 2015 (KR) .................. 10-2015-0125864
Aug. 24, 2016 (KR) .................. 10-2016-0107601

(51) Int. Cl.
*B01F 13/08* (2006.01)
*G01N 1/38* (2006.01)
(Continued)

(52) U.S. Cl.
CPC .......... *B01F 13/08* (2013.01); *B01F 13/0023* (2013.01); *B01F 13/0818* (2013.01);
(Continued)

(58) Field of Classification Search
CPC .. B01F 13/08; B01F 13/0818; B01F 13/0023; B01F 15/0279; B01L 3/502;
(Continued)

(56) References Cited

U.S. PATENT DOCUMENTS

2006/0178638 A1    8/2006  Reynolds
2007/0166192 A1*   7/2007  Ehben ............... B01L 3/502715
                                                          422/400
(Continued)

FOREIGN PATENT DOCUMENTS

CN    202289943 U      7/2012
JP    H09-061425 A     3/1997
(Continued)

OTHER PUBLICATIONS

International Search Report for PCT/KR2016/009640 dated Jan. 10, 2017 from Korean Intellectual Property Office.
(Continued)

*Primary Examiner* — Jennifer Wecker
*Assistant Examiner* — Michael Paul Shimek
(74) *Attorney, Agent, or Firm* — Paratus Law Group, PLLC

(57) ABSTRACT

Disclosed are a sample pretreatment module and a sample pretreatment method using the same. The sample pretreatment module including: a body having a chamber for accommodating a sample therein; a cap coupled to one end of the body; a dotting substrate provided to have at least some portion of it dotted with the reagent and be inserted into the chamber; a discharge tip movably coupled to the other end of the body for discharging a sample accommodated in the chamber; a permanent magnet provided to be inserted in the chamber and mix the sample by rotating owing to a magnetic force acting in accordance with a change in a magnetic field externally applied; and a moving
(Continued)

unit movably provided in the cap and pressing the sample in the chamber according to the movement to discharge the sample to the outside.

6 Claims, 19 Drawing Sheets

(51) Int. Cl.
*B01F 15/02* (2006.01)
*B01L 3/00* (2006.01)
*B01F 13/00* (2006.01)
*H02N 11/00* (2006.01)
*G01N 35/10* (2006.01)
*G01N 35/00* (2006.01)

(52) U.S. Cl.
CPC ......... *B01F 15/0279* (2013.01); *B01L 3/502* (2013.01); *B01L 3/50825* (2013.01); *G01N 1/38* (2013.01); *H02N 11/006* (2013.01); *B01L 2200/0684* (2013.01); *B01L 2300/043* (2013.01); *B01L 2300/0672* (2013.01); *B01L 2300/0867* (2013.01); *B01L 2400/043* (2013.01); *B01L 2400/0403* (2013.01); *B01L 2400/0478* (2013.01); *B01L 2400/0683* (2013.01); *G01N 35/1079* (2013.01); *G01N 2035/00534* (2013.01)

(58) Field of Classification Search
CPC .......... B01L 3/50825; B01L 2300/043; B01L 2400/0683; B01L 2400/043; B01L 2400/0478; B01L 2300/0672; B01L 2300/0867; B01L 2400/0403; B01L 2200/0684; H02N 11/006; G01N 1/38; G01N 2035/00534; G01N 35/1079; G01N 2001/386

See application file for complete search history.

(56) References Cited

U.S. PATENT DOCUMENTS

| | | | |
|---|---|---|---|
| 2011/0151577 A1 | 6/2011 | Zhang et al. | |
| 2013/0074614 A1* | 3/2013 | Holmes | B01L 3/50825 73/864.01 |
| 2013/0216452 A1* | 8/2013 | Phan | A61B 5/1411 422/547 |
| 2015/0219536 A1 | 8/2015 | Hoder et al. | |

FOREIGN PATENT DOCUMENTS

| | | |
|---|---|---|
| JP | H10-170510 A | 6/1998 |
| JP | 2006-329728 A | 12/2006 |
| JP | 2007-000719 A | 1/2007 |
| JP | 2007-127468 A | 5/2007 |
| JP | 2007-192739 A | 8/2007 |
| JP | 2008-253980 A | 10/2008 |
| JP | 2008-286719 A | 11/2008 |
| JP | 2010-174817 A | 8/2010 |
| KR | 10-2006-0005390 | 1/2006 |
| KR | 10-0900655 B1 | 6/2009 |

OTHER PUBLICATIONS

Extended European Search Report for related EP application No. 16842245.9 dated Apr. 24, 2019 from European Patent Office.

* cited by examiner

SAMPLE PRETREATMENT MODULE AND PRETREATMENT METHOD USING THE SAME

CROSS REFERENCE TO PRIOR APPLICATIONS

This application is a National Stage Patent Application of PCT International Patent Application No. PCT/KR2016/009640 (filed on Aug. 30, 2016) under 35 U.S.C. § 371, which claims priority to Korean Patent Application Nos. 10-2015-0125864 (filed on Sep. 4, 2015) and 10-2016-0107601 (filed on Aug. 24, 2016), which are all hereby incorporated by reference in their entirety.

TECHNICAL FIELD

The present invention relates to a module for pretreatment of sample and a method for pretreatment of sample using the same, more particularly to sample pretreatment module and a pretreatment method using the same for ensuring reliability of a test result by reducing operator errors during a pretreatment process, making the pretreatment process simple and easy to operate, and enabling a fixed quantity of pretreated sample to be discharged.

BACKGROUND ART

In general, the analysis of fluid samples is widely used not only in the fields of chemistry and biotechnology but also in the field of diagnosis through analysis of blood and body fluids collected from patients.

In recent years, a variety of miniaturized analytical and diagnostic instruments and techniques have been developed to perform such fluid sample analysis more easily and efficiently.

On the other hand, one of the important methods for analyzing such fluid samples is to pretreat fluid samples.

Here, the pretreatment of the fluid sample means that a desired amount of sample extracted before analysis of the fluid sample, for example, is accurately treated at a proper ratio in a dilution buffer and the like, is mixed with a solid or liquid reaction reagent, or is separated and refined by using a filling or a supporter.

Typically, a fluid sample is pretreated using a pipette or dropper for this purpose, but regarding analysis of sample in a unit of lab-on-a-chip or lab-on-a-tip, it is not easy for an operator to precisely treat a desired minimum amount of sample using a pipette or dropper since the amount of sample used in the pretreatment is very small and the sample must be treated very accurately.

In addition, in the field inspection method, the collected sample is pretreated and then put into the measuring instrument again. In the input step, there is a problem of error in the amount of the sample applied once again.

Therefore, there is a need for a sample pretreatment module capable of minimizing operator's error in pretreatment of a very small amount of blood or other samples, facilitating the pretreatment process easily and easily, and capable of discharging a fixed quantity of pretreated samples.

DISCLOSURE

Technical Problem

Embodiments of the present invention minimize errors that may occur when a worker manually proceeds, and ensure accuracy and uniformity in the pretreatment and test results of the samples.

In addition, it is intended to provide a user-friendly experimental environment by improving the convenience of the operation by mixing and discharging simply the sample.

In addition, it is intended to maintain and control the pressure in the chamber uniformly so as to prevent the outpouring of the sample even in sudden changes of the pressure in the chamber.

In addition, it is intended to heat the sample to the desired temperature within a short time to increase the mixing and reaction efficiency of the sample by increasing the thermal transfer capacity for the sample in the chamber.

In addition, it is intended that the mixing effect of the sample is increased by using the magnetic force and the mechanical drive is minimized.

In addition, it is intended to provide a sample pretreatment module capable of quantitatively discharging a fixed amount of sample after pretreatment of the sample.

Technical Solution

According to an aspect of the present invention, there is provided a sample pretreatment module comprising: a body having a chamber for accommodating a sample therein; a cap coupled to one end of the body; a dotting substrate provided to have at least some portion of it dotted with the reagent and be inserted into the chamber; a discharge tip movably coupled to the other end of the body for discharging a sample contained in the chamber; a permanent magnet provided to be inserted in the chamber and mix the sample by rotating owing to a magnetic force acting in accordance with a change in a magnetic field externally applied; and a moving unit movably provided in the cap and pressing the sample in the chamber according to the movement to discharge the sample to the outside.

The dotting substrate may comprise a body of the dotting substrate, at least one, a first extension portion extending at one side of the body of the dotting substrate, and at least one, a second extension portion extending at the other side of the body of the dotting substrate.

The entire length of the dotting substrate may be configured to coincide with the length of the chamber.

The permanent magnet may be magnetized in N-S or S-N along the vertical direction.

The cap may include a hollow portion connected with the chamber, and the moving unit may be movably provided in the hollow portion.

The sample pretreatment module according to the present invention may further comprise at least one venting line formed along the inner wall of the hollow portion so as to adjust the pressure in the chamber.

The sample pretreatment module according to the present invention may further comprise a penetration membrane interposed between the chamber and the discharge tip, and a penetration portion provided at one end of the chamber-side of the discharge tip and forming a discharge flow passage for discharging the sample in the chamber by penetrating the penetration membrane as the discharge tip moves toward the chamber.

The sample pretreatment module according to the present invention may further comprise a penetration guide formed in the penetration membrane for letting the penetration portion pass through a predetermined position of the penetration membrane.

According to another aspect of the present invention, there is provided a sample pretreatment method, comprising: dotting and drying a buffer in a chamber forming a predetermined space in a body; Inserting a dotting substrate, a permanent magnet into the chamber, and coupling a discharge tip to the body; Injecting a sample into the chamber; closing the chamber by coupling a cap connected to one end of the body; and mixing the sample by rotating the permanent magnet by applying magnetic force to the permanent magnet in the chamber.

The sample pretreatment method according to the present invention may further comprise discharging a fixed amount of the sample by letting a penetration membrane be penetrated by a penetration portion and then moving a moving unit provided in the cap.

The sample pretreatment method according to the present invention may further comprise dotting gold nanoparticles on one side of the dotting substrate and drying them before inserting the dotting substrate into the chamber.

Advantageous Effects

Embodiments of the present invention minimize the errors that may occur when the operator proceeds directly by hand, and ensure accuracy and uniformity in the pretreatment and test results of the sample.

In addition, mixing and discharging of the sample can be performed easily, thereby improving the convenience of the operation and providing a user-friendly experimental environment.

In addition, the pressure in the chamber can be uniformly maintained and adjusted so as to prevent the outpouring of the sample even in sudden changes of the pressure in the chamber.

In addition, it is possible to heat the sample to a desired temperature within a short time to increase efficiency in mixing and reaction of the sample by increasing the heat transfer ability for the sample contained in the chamber, In addition, the mixing effect of the sample can be increased by using the magnetic force, and the mechanical drive can be minimized.

In addition, it is possible to provide a sample pretreatment module capable of discharging a fixed amount of sample after the pretreatment.

BEST MODES

Figure 1:
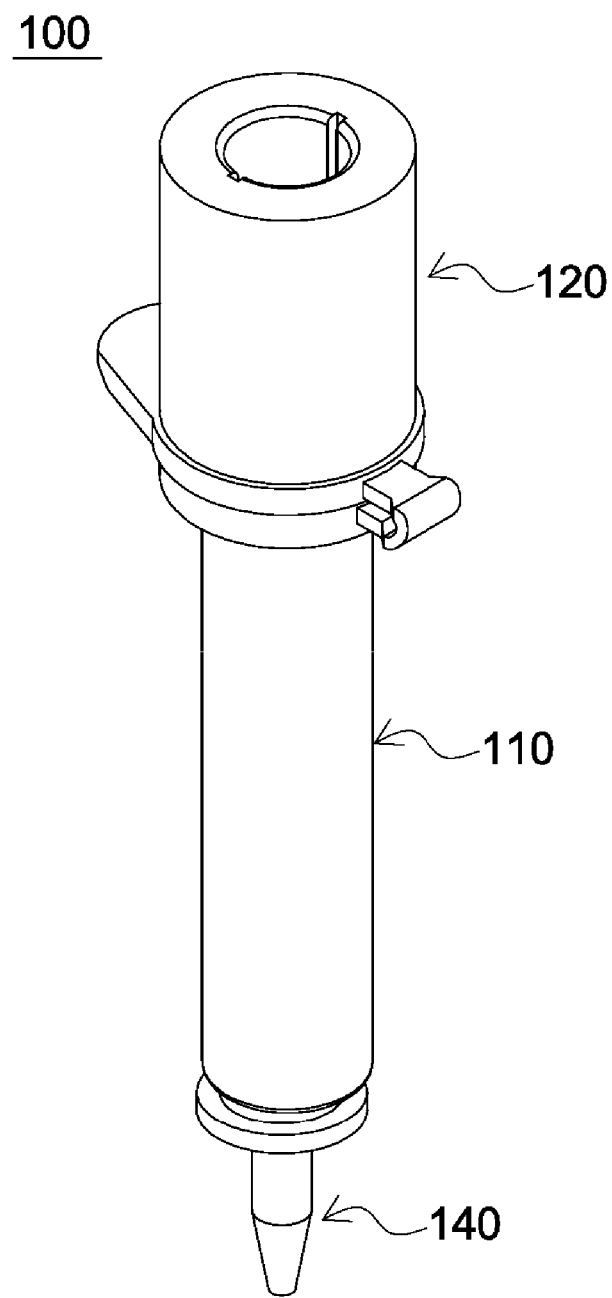
FIG. 1 is a perspective view of a sample pretreatment module according to an embodiment of the present invention.

Hereinafter, preferred embodiments of the present invention will be described in detail with reference to the accompanying drawings. However, the present invention is not limited to the embodiments described herein but may be embodied in other forms. Rather, the embodiments disclosed herein are being presented so that this disclosure will be thorough and complete, and will fully convey the concept of the invention to those skilled in the art. Like reference numerals designate like elements throughout the specification.

Figure 2:
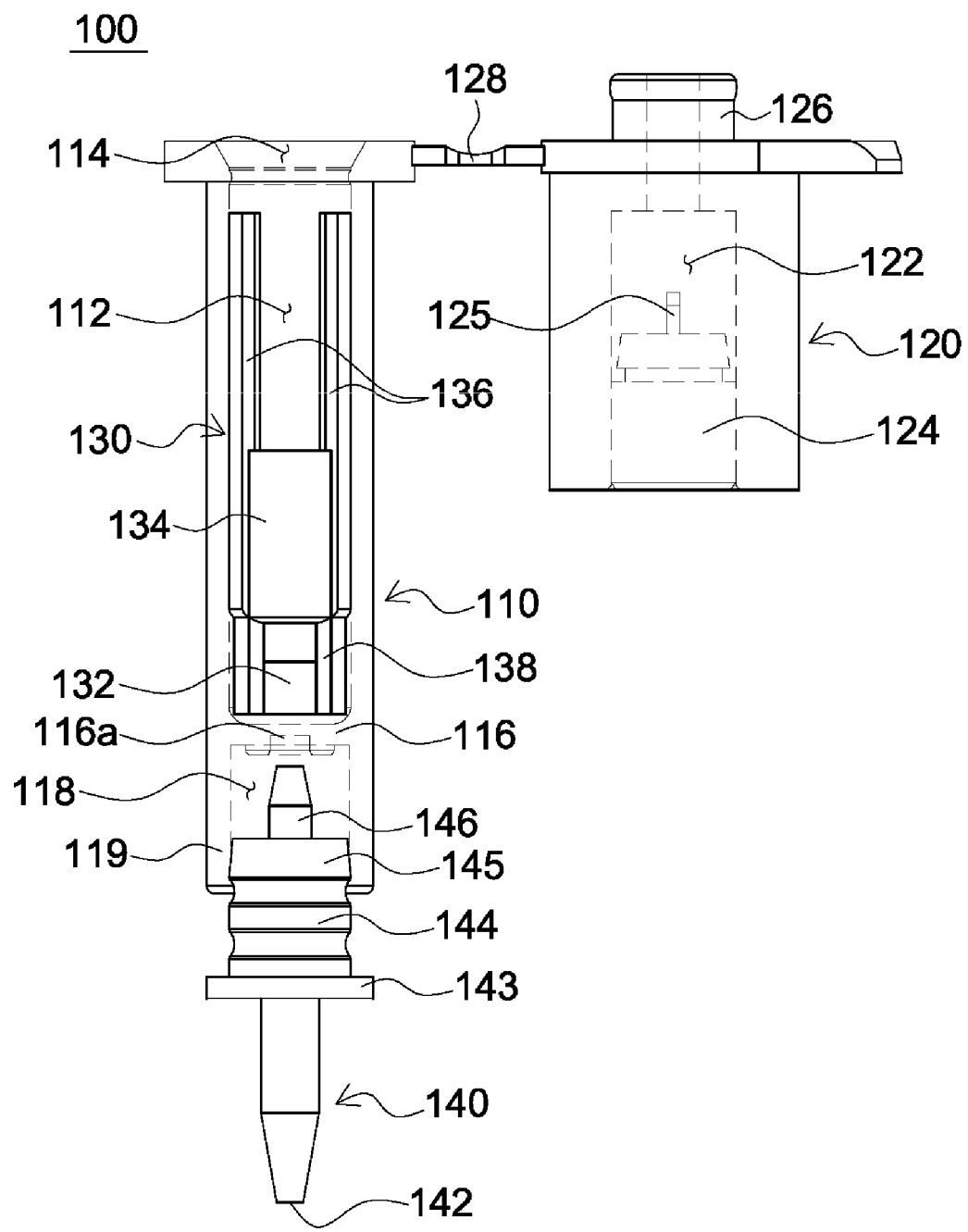
FIG. 2 is a side view of a sample pretreatment module according to an embodiment of the present invention.
Figure 3:
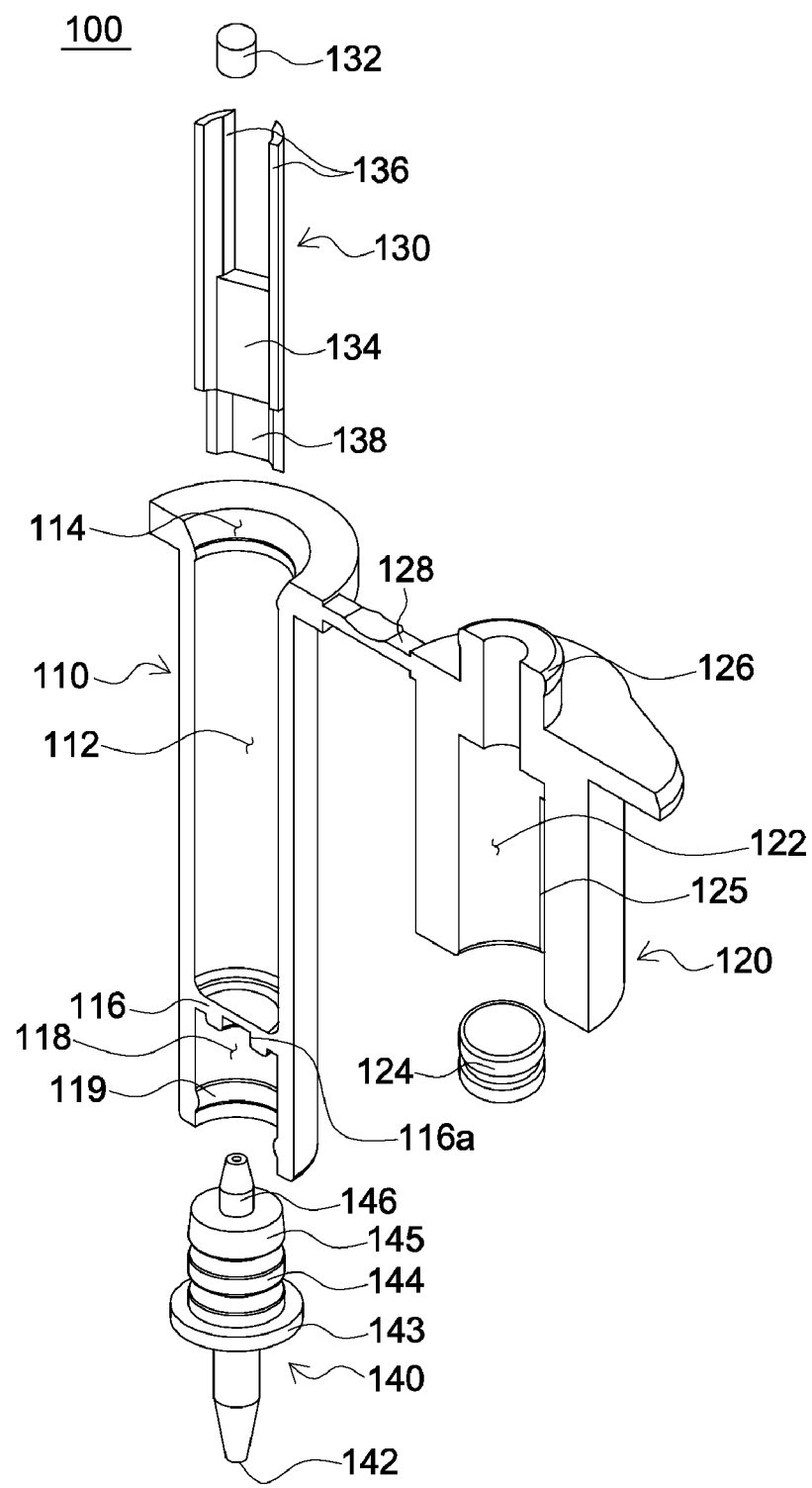
FIG. 3 is a partially exploded perspective view of a sample pretreatment module according to an embodiment of the present invention.
Figure 4:
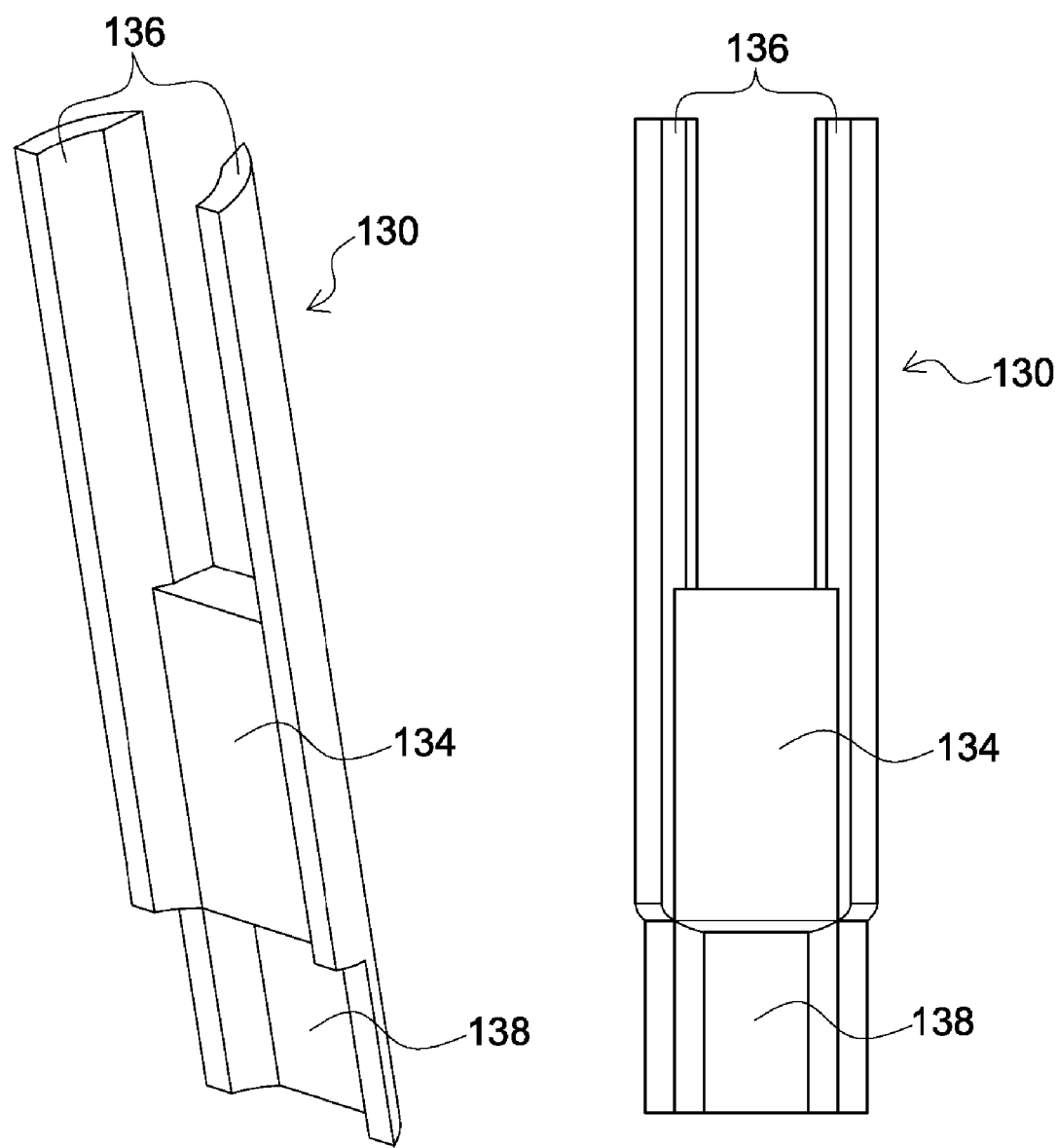
FIG. 4 is a perspective view and a front view showing a dotting substrate of a sample pretreatment module according to an embodiment of the present invention
Figure 5:
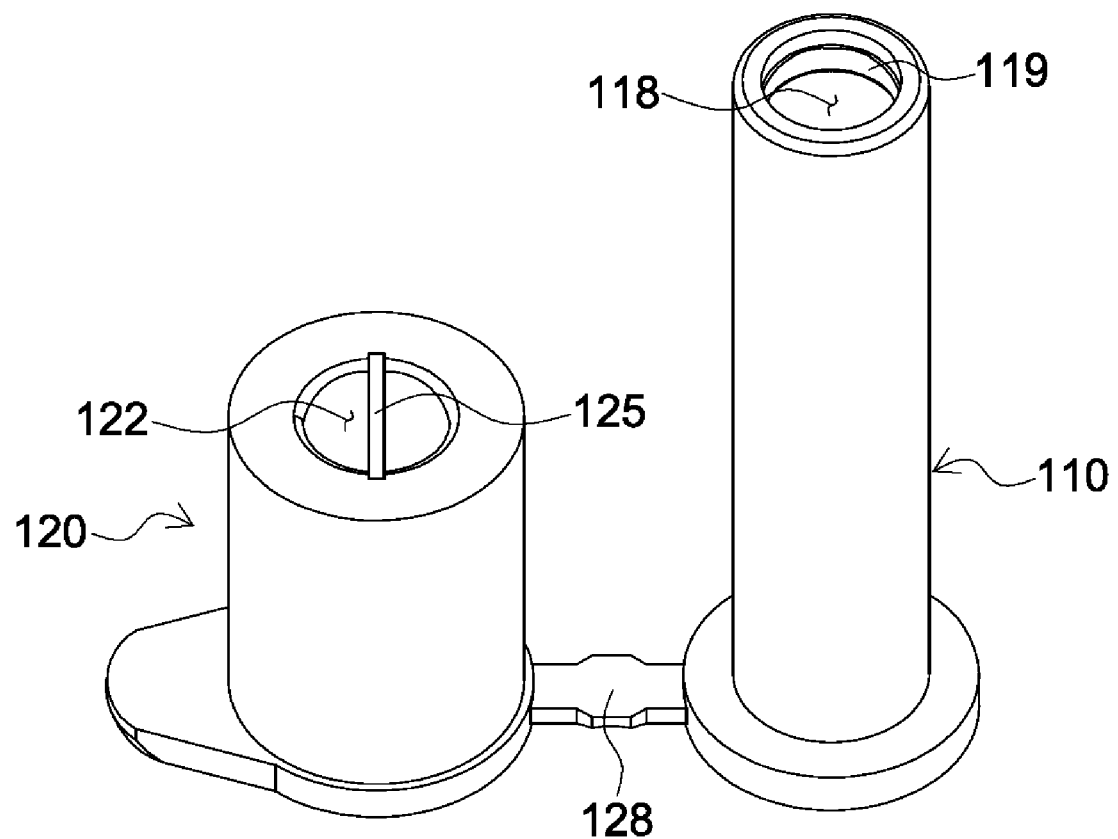
FIG. 5 is a perspective view illustrating a body and a cap of a sample pretreatment module according to an embodiment of the present invention.
Figure 6:
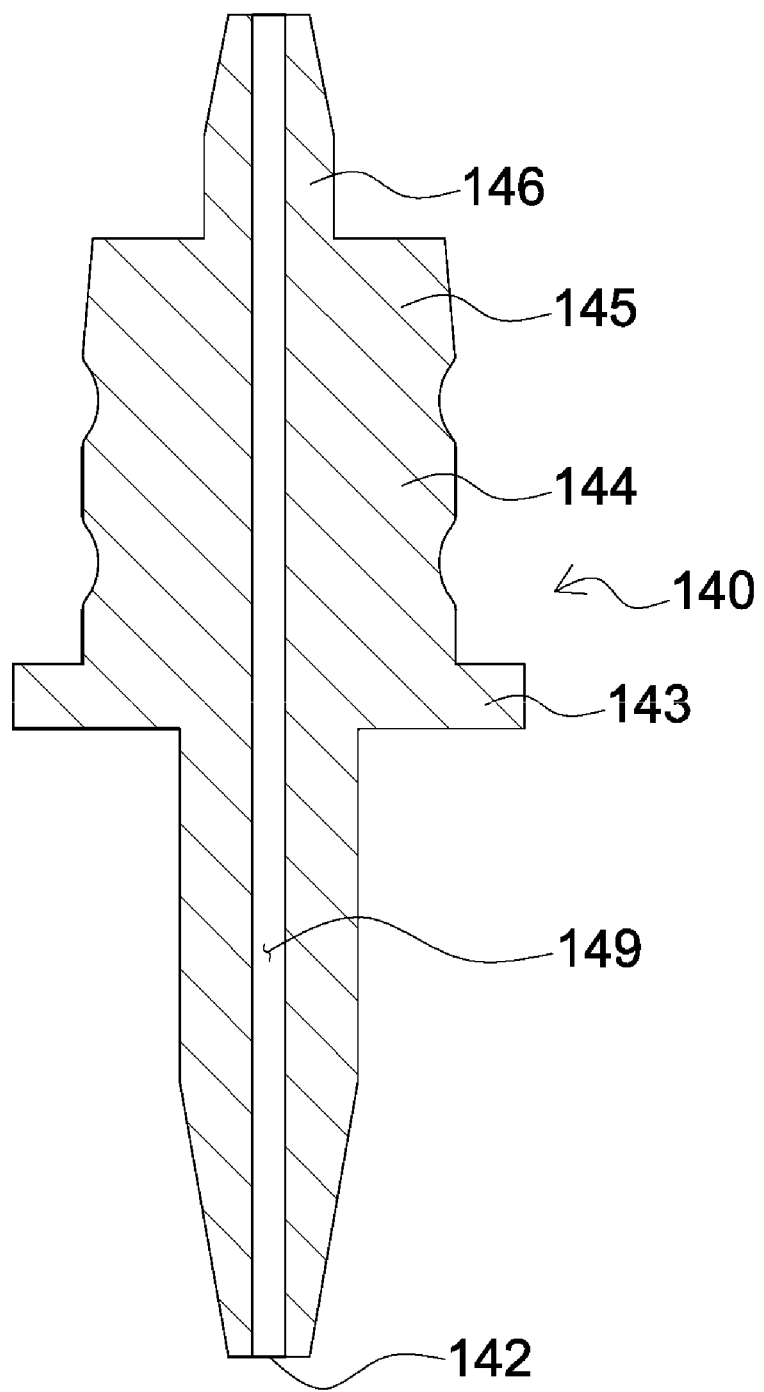
FIG. 6 is a cross-sectional view illustrating a discharge tip of a sample pretreatment module according to an embodiment of the present invention.
Figure 7:
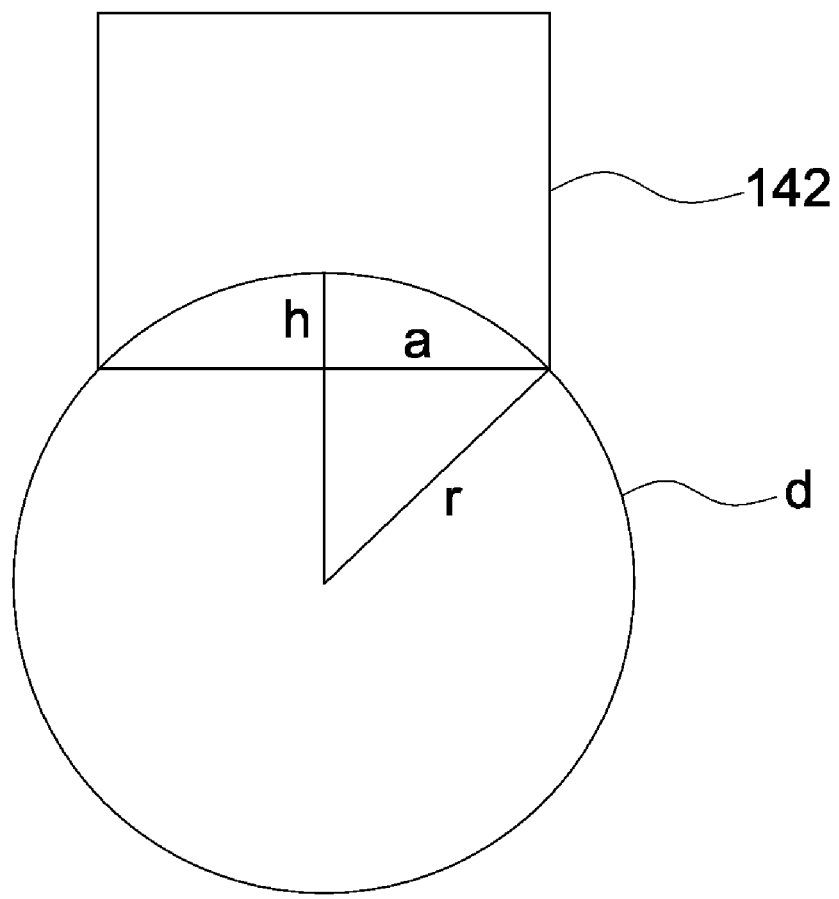
FIG. 7 is a view for explaining a method of calculating a diameter of a discharge port for discharging a fixed amount by a sample pretreatment module according to an embodiment of the present invention.

FIG. 1 is a perspective view of a sample pretreatment module according to an embodiment of the present invention, FIG. 2 is a side view of a sample pretreatment module according to an embodiment of the present invention, FIG. 3 is a cross-sectional exploded perspective view of the pretreatment module according to an embodiment of the present invention. FIG. 4 is a perspective view and a front view showing a dotting substrate of a sample pretreatment module according to an embodiment of the present invention, FIG. 5 is a perspective view showing a body and a cap of a sample pretreatment module according to an embodiment of the present invention, FIG. 6 is a cross-sectional view illustrating a discharge tip of a sample pretreatment module according to an embodiment of the present invention. FIG. 7 is a view for explaining a method of calculating a diameter of a discharge port for discharging a fixed amount by a sample pretreatment module according to an embodiment of the present invention.

By referring to FIG. 1 to FIG. 7, a sample pretreatment module 100 according to an embodiment of the present invention may comprise a body 110 having a chamber 112 for accommodating a sample therein, a cap 120 coupled to one end of the body 110, a dotting substrate 130 of which at least some portion is dotted and inserted into the chamber 112, and a discharge tip 140 movably coupled to the other end of the body 110 for discharging the sample accommodated by the chamber 112.

In this embodiment, the body 110 may be formed in a cylindrical shape having a predetermined height, and a chamber 112 may be formed in the body 110 to form a cylindrical space. The shape of the body 110 and the chamber 112 is not limited to a cylindrical shape, and may be modified into various shapes as necessary.

The body 110 is preferably formed as thin as possible so as to increase the heat transfer ability when the sample contained in the chamber 112 is heated.

An inlet 114 is provided at one side of the body 110 so that a sample or buffer can be injected into the chamber 112. The dotting substrate 130 can be also inserted into the chamber 112 through the inlet 114.

A discharge tip 140 is coupled to the other side of the body 110 and a penetration membrane 116 may be provided between the chamber 112 and the discharge tip 140. The sample can be accommodated in the chamber 112 by blocking the communication with the discharge tip 140 until the penetration membrane 116 is penetrated by the penetration portion 146, which will be described later.

The penetration membrane 116 is dried in a state where a dotted buffer is applied to the chamber 112 before the sample is injected. Then the injected sample is passed through a pretreatment process by being mixed with a buffer to form a diluted or mixed solution.

It is also possible to apply a pretreatment material to the inside of the chamber 112, such as the inner wall of the chamber 112 as well as the penetration membrane 116.

The body 110, the discharge tip 140, the cap 120 and the penetration membrane 116 may be made of a synthetic resin such as PS (polystyrene), PP (polypropylene), or PE (polyethylene) or other materials with elasticity can also be used and can be produced by injection molding using an elastic material.

Particularly, when vitamin D is used as a buffer, it is preferable that the resin material of the discharge tip 140 is made of PP. This is from taking into account the viscosity of the solution. Since the pretreatment solution of vitamin D has a low viscosity, the discharge tip 140 is made hydrophobic. Accordingly, the sample is not flowed inadvertently and is discharged as a fixed amount in a controlled manner.

On the contrary, when the viscosity of the pretreatment solution is high, the discharge tip 140 may be made of a hydrophilic material. Accordingly the sample mixed with the buffer can be smoothly discharged.

The dotting substrate 130 is accommodated in the chamber 112 together with the sample, and inserted with at least one side dotted with a predetermined reagent. Accordingly, the accommodated sample can be reacted or mixed with the reagent. The dotting substrate 130 can be inserted with being dotted with not only a reagent but additional samples or pretreatment material.

The dotting substrate 130 may comprise a dotting substrate body 134, a first extension portion 136 which is at least one extending at one side of the dotting substrate body 134, and a second extension portion 138 which is at least one extending at the other side of the dotting substrate 134.

The dotting substrate body 134 has a substantially rectangular polygonal shape and the reagent described above may be mainly applied to the second extension portion 138. The body 134 and the first extension portion 136 may be dotted with reagents and inserted into the chamber 112.

In this embodiment, the first extension portion 136 may extend upward from both sides of the dotting substrate body 134. In this embodiment, the first extension portion 136 is formed by extending the first extension portion 136 in two portions to secure a sample injection space, and to provide a space for a pipette to enter the entrance of the chamber 112. In addition, the dotting substrate 130 is designed to contact so closely the outer wall of the chamber 112 that the dotting substrate 130 can be inserted into the chamber 112 even in case an error occurs.

The second extension portion 138 may extend downward from a lower portion of the dotting substrate body 134. At this time, the second extension portion 138 may extend downwardly from the body 134 in a stepped manner.

The reagent which is originally to be dotted should exist within the area where the sample is contacted. When the reagent is dropped on the surface of the second extension portion 138, the reagent is diffused when it is dried on the surface of the second extension portion 138. Accordingly, it is difficult to locally control the doting area. However, in this embodiment, since a step is formed between the dotting substrate body 134 and the second extension portion 138, the reagent can be dotted without spreading out of the step difference.

The length of the second extension portion 138 may be extended as much as (or below) the level of the sample accommodated in the chamber 112 to allow the sample and the reagent to react completely. That is, the area of the second extension portion 138 or the extending length thereof can be adjusted according to the amount of the sample to be injected.

The shape of the dotting substrate 130 is not limited to that shown in FIG. 4, and may be modified into various shapes as necessary.

A permanent magnet 132 may be inserted together the dotting substrate 130 into the chamber 112. In this embodiment the permanent magnet 132 is formed in a cylindrical shape, and performs a role of mixing the sample by rotating owing to magnetic force acting in accordance with a change of magnetic field externally applied. At this time, the permanent magnet 132 may be seated in the space formed by the second extension portion 130 to perform sample mixing.

The permanent magnet 132 is magnetized in N-S or S-N along the vertical direction. When the vortexing magnet 320 (See FIG. 17) is rotated around the chamber 112, the permanent magnet 132 is also rotated along the circumferential direction.

At this time, the rotation axis of the vortexing magnet 320 and the rotation axis of the permanent magnet 132 are perpendicular to each other. In case the vortexing magnet 320 is positioned above or below the sample pretreatment module 100, the rotation axis of the vortexing magnet 320 and the rotation axis of the permanent magnet 132 are parallel to each other.

As described above, the second extension portion 138 of the dotting substrate 130 may be provided with additional samples dotted and dried thereon. For example, gold nanoparticles (See G, FIG. 13) can be dotted and dried on the second extension portion 138 to be mixed with the sample in the chamber 112.

Apart from the cold nanoparticles (G), a variety of pretreatment materials can be used. As a method of applying the pretreatment material to the dotting substrate 130, not only the aforementioned dotting and drying but also freezing drying and the like can be selectively applied.

In addition, the pretreatment material can be accommodated in the chamber 112 such as the penetration membrane 116, inner wall of the chamber 112, and the like by using the method described above.

The entire length of the dotting substrate 130 may be configured to coincide with the length of the chamber 112. Accordingly, when the dotting substrate 130 is inserted in the chamber 112, it can perform a role of a frame maintaining the shape of the chamber 112.

A cap 120 may be coupled to the inlet 114 of the body 110. The cap 120 may be connected to one side of the body 110 by a cap connection portion 128. The cap 120 may comprise a hollow portion 122 communicating with the chamber 112 and a moving unit 124 provided to be movable in the hollow portion 122 so as to discharge the sample in the chamber 112 by pressurizing it according to the movement. The moving unit 124 may be made of, for example, a rubber packing.

The hollow portion 122 may communicate with the chamber 112 when the cap 120 is coupled to the body 110. For this, the cap 120 is provided with a chamber communicating portion 126 extending from the hollow portion 122. The chamber communicating portion 126 is inserted into the inlet 114 so that the cap 120 can be inserted into the chamber communicating portion 126, At the same time, the chamber 112 and the hollow portion 122 can be connected with each other.

When the moving unit 124 inserted into the hollow part 122 is pressurized, the moving unit 124 moves in the direction of the chamber 112 and pressure is transferred into the chamber 112 to discharge the sample to the outside.

However, since the chamber 112 is blocked by the penetration membrane 116 as described above, the penetration membrane 116 must be penetrated before the pretreated sample is discharged. A penetration portion 146 is provided in the chamber 112 to form a discharge flow passage 149 through which the sample in the chamber 112 can be discharged by penetrating the penetration membrane 116 as the discharge tip 140 moves toward the chamber 112.

As shown in FIG. 6, the discharge tip 140 has a double-pointed structure in which the discharging portion 142 at one end and the penetration portion 146 at the other end are communicated by a discharge flow passage 149. Specifically, the discharge tip 140 has an insertion body 144 to be inserted into an insertion hole 118 formed in the body 110, and the penetration portion 146 extends from the upper end of the insertion body 144. The penetration portion 146 is formed in a pointed shape by being tapered so as to penetrate the penetration membrane 116 while moving.

In this embodiment, the penetration portion 146 may have a shape that is symmetric, inclined, and tapered so that the center portion can become sharp.

A latching protrusion 119 having a convex shape along the circumferential direction is formed on the inner circumferential side of the insertion hole 118. An latching portion 145 may be formed in an upper portion of the insertion body 144 so as to be engaged with the latching protrusion 119 during initial assembly to limit additional movement of the discharge tip 140.

Accordingly, when the body 110 and the discharge tip 140 are initially assembled, the discharge tip is inserted into the body to the extent that the latching portion 145 is engaged with the latching protrusion 119. When the sample is discharged after the sample has been diluted or mixed, the penetration portion 146 penetrates the penetration membrane 116 by pushing it with an external force.

In this case, the penetration guide 116a may be formed for guiding the penetration portion such that the penetration portion 146 can penetrate a predetermined spot of the penetration membrane 116. As shown in FIGS. 2 and 3, the penetration guide 116a guides the penetration portion 146 so that the central portion of the penetration membrane 116 can be penetrated. The penetration guide 116a is formed in such a manner that when the body 110 and the discharge tip 140 are initially assembled, the possibility can be restrained that the penetration portion 146 penetrates an arbitrary spot of the penetration membrane 116 and the sample is outpoured.

A flange portion 143 is formed at a lower portion of the insertion body 144. Since the flange portion 143 is caught on the rim of the insertion hole 118 of the body 110, it is possible to restrict the further advance of the discharge tip 140 after the penetration portion has penetrated the penetration membrane 116.

As such, the discharge flow passage 149 is formed through which the sample in the chamber 112 can be discharged in the state in which the penetration portion 146 of the discharge tip 140 has penetrated the penetration membrane 116. In such condition, the sample can be discharged through the discharge portion 142 by pressing the moving unit 124 provided in the hollow portion 122 of the cap 120 as described above.

The amount of the sample to be discharged here depends on the moving distance and speed of the moving unit 124. By configuring and applying a device capable of applying a constant speed and distance although the operator can directly press the moving unit 124, the amount to be discharged can be maintained constantly at a fixed quantity.

On the other hand, when the same speed and moving distance are applied, the amount of the discharged sample can be adjusted by varying the size of the discharge portion 142. Since the discharge tip 140 is detachably coupled to the body 110, the discharge portion 142 can be replaced with a discharge portion 142 having a diameter suitable for the kind of the sample and the amount to be discharged.

In addition, the droplet volume of the discharged sample can be changed according to the size of the discharge portion 142, and the discharge volume can be adjusted according to the diameter of the discharge portion 142.

As shown in FIG. 7, it is preferable that the discharge portion 142 is formed to have a diameter corresponding to the kind of sample pretreated in the chamber 112, the amount to be discharged, and the like.

For this purpose, the diameter of the discharge portion 142 may be determined by the size of a spherical cap. For example, when the radius of the discharge portion 142 is a, the radius of the sample droplet d to be discharged is r, and the height of the cut portion of the sphere is h, the volume V of the sample droplet d is $V=4/3\pi r^3$, and the diameter of the discharge portion 142 can be obtained from the equation $r=(a^2+h^2)/2h$.

It can be also obtained from the surface tension of the sample droplet d. For example, the diameter of the discharge portion 142 may be obtained from a formula of $W=2\pi r\gamma$, wherein W=weight of reacted sample drops, r=radius of discharge passage, $\gamma$=surface tension.

On the one hand, when the penetration portion 146 penetrates the penetration membrane 116, the pressure in the chamber 112 rapidly increases, and the sample contained in the chamber 112 may be leaked out. In addition, an unintended external force may be applied to the outer circumference of the body 110, which may cause the pressure in the chamber 112 to rise.

A venting line 125 may be formed on the inner wall of the hollow portion 122 of the cap 120 to adjust the pressure in the chamber 112 in case of the above-situation. The venting line 125 is formed to have a predetermined length along the vertical direction on the inner wall of the hollow portion 122 and may control the pressure in the chamber 112 by discharging the increased pressure in the chamber 112 to the outside.

In this embodiment, the venting line 125 is formed at one side and the other side of the inner wall of the hollow portion 122 so as to keep controlling the pressure in the chamber 112 even when one venting line 125 is blocked.

Figure 8:
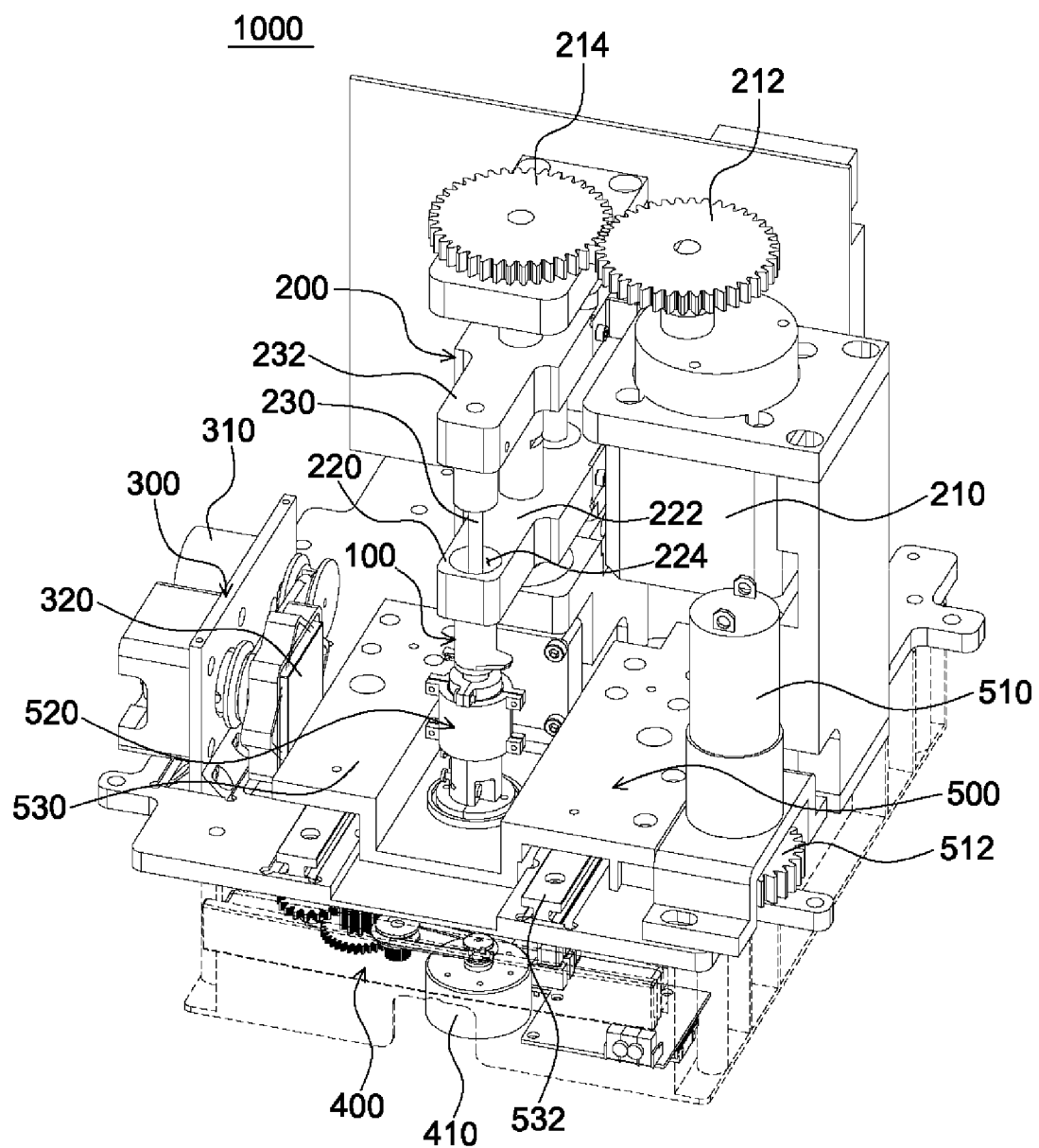
FIG. 8 is a perspective view of a sample pretreatment system according to an embodiment of the present invention.
Figure 9:
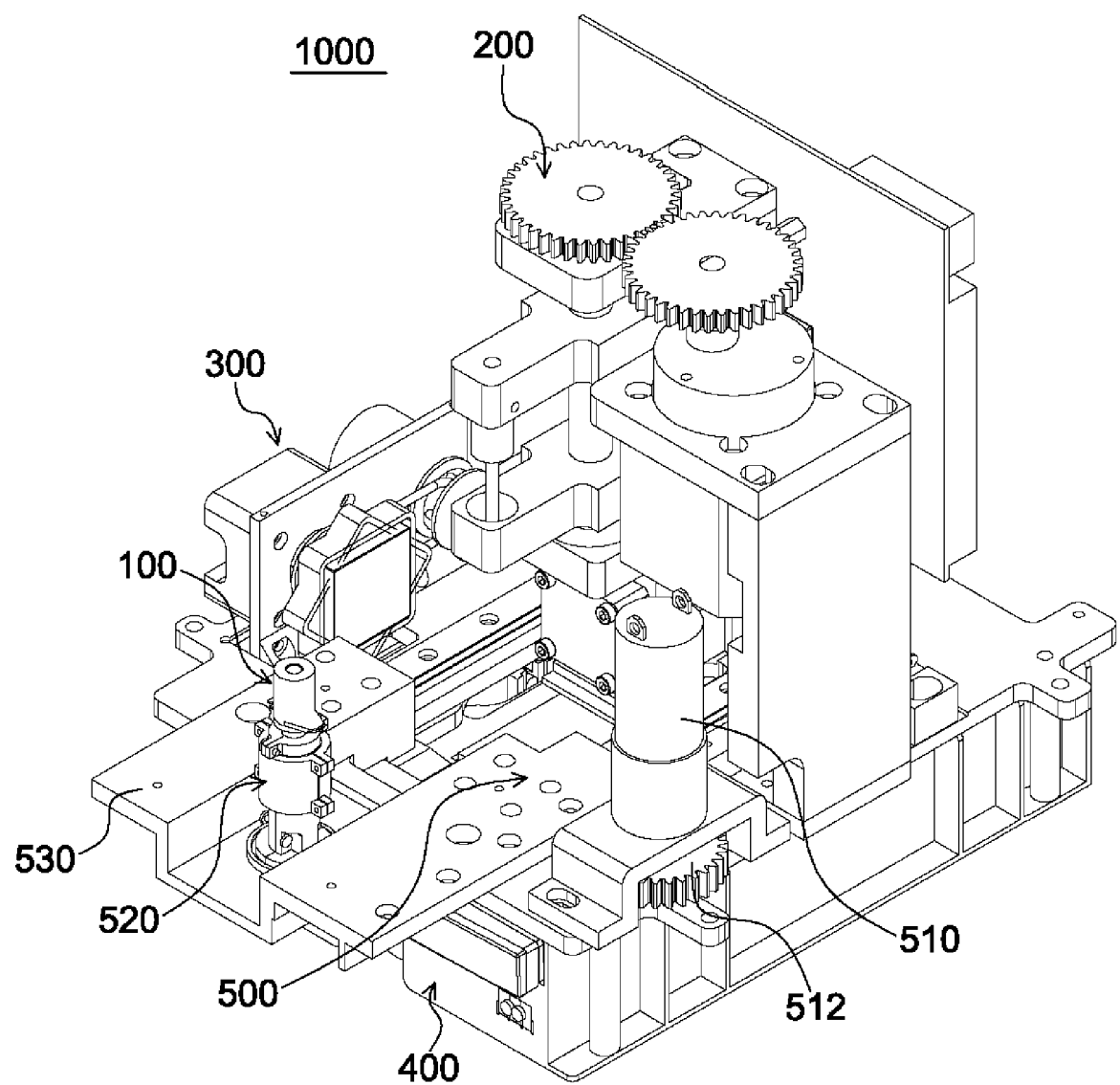
FIG. 9 is a perspective view showing a state in which a sample pretreatment module is seated in a state in which a holder stage of a sample pretreatment system is taken out according to an embodiment of the present invention.
Figure 10:
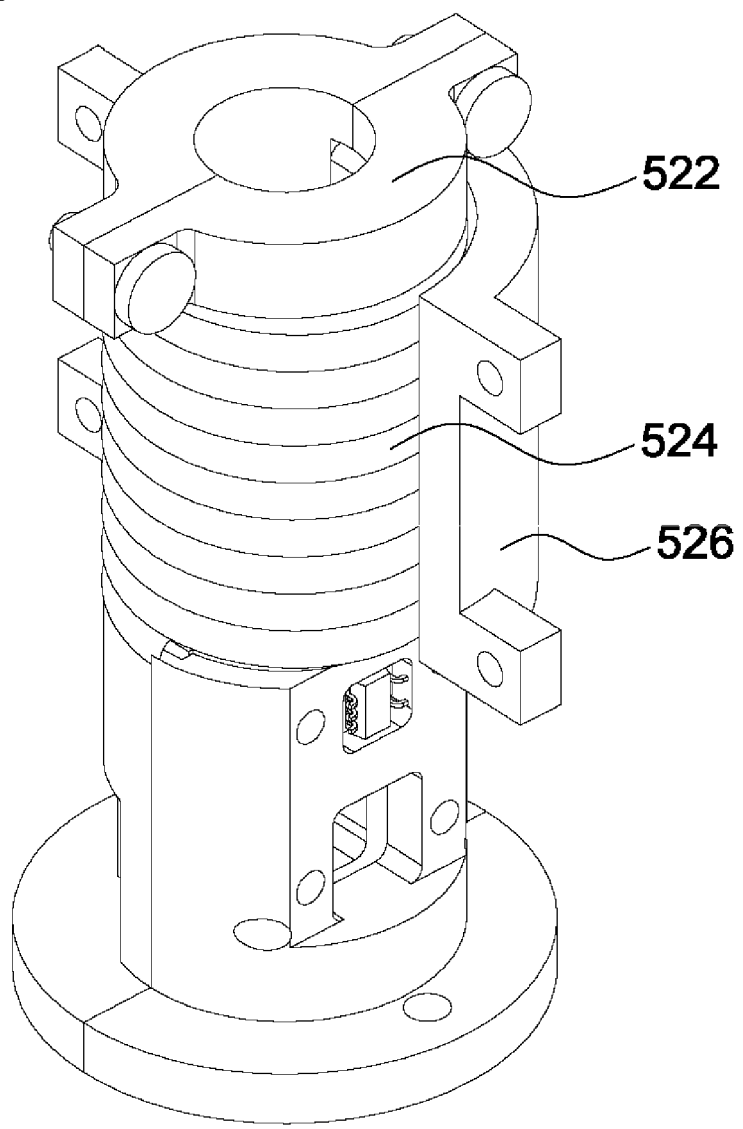
FIG. 10 is a perspective view showing a module holder of a sample pretreatment system according to an embodiment of the present invention.
Figure 11:
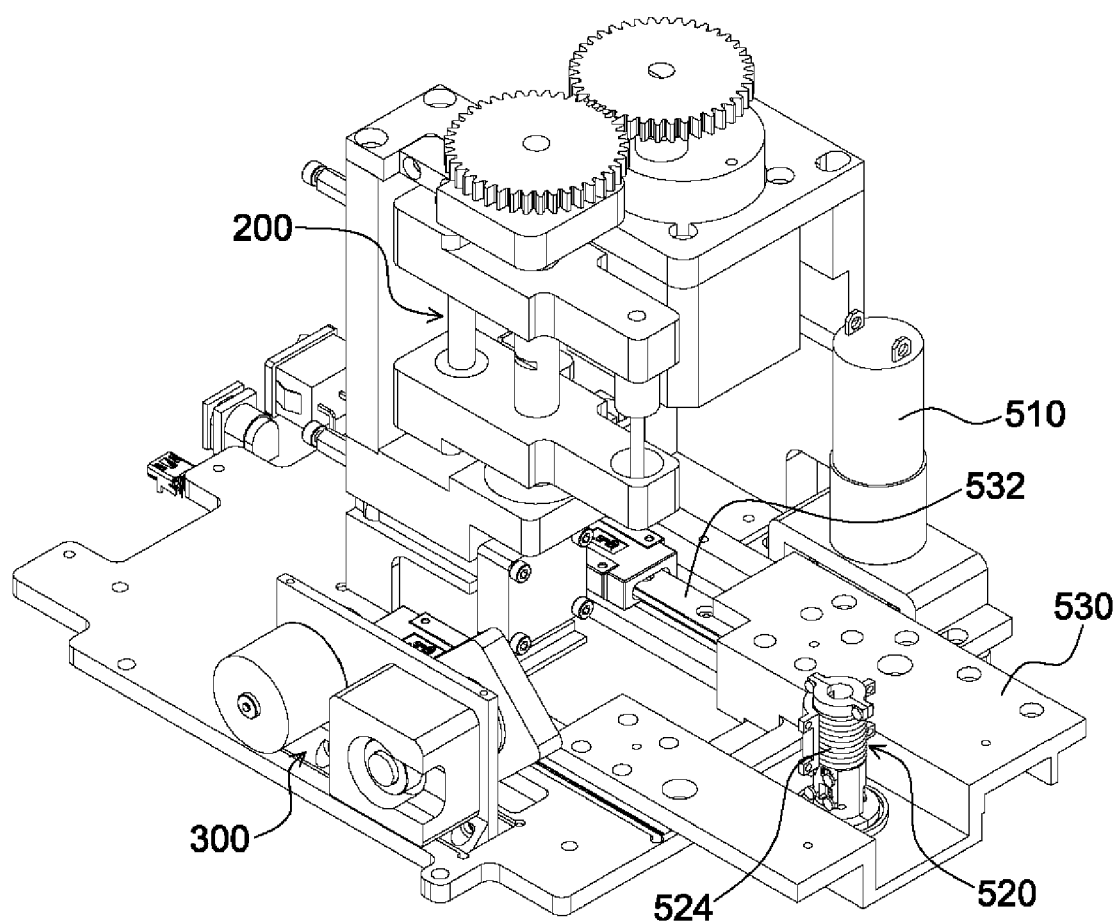
FIG. 11 is a perspective view showing a state in which the holder stage of the sample pretreatment system is taken out according to the embodiment of the present invention.
Figure 12:
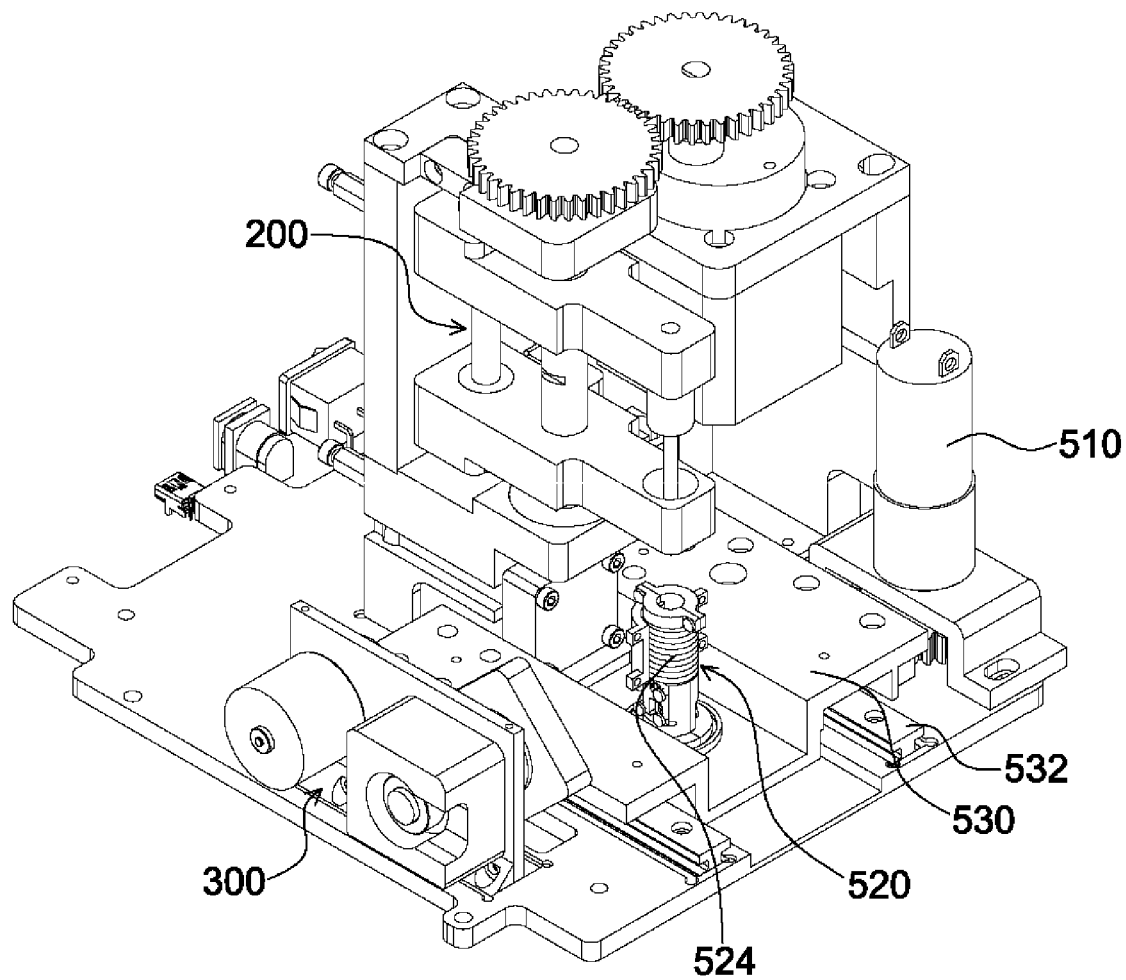
FIG. 12 is a perspective view showing a state in which a holder stage of a sample pretreatment system is contained according to an embodiment of the present invention.

FIG. 8 is a perspective view of a sample pretreatment system according to an embodiment of the present invention, FIG. 9 is a perspective view showing a state in which a sample pretreatment module is seated in a state in which a holder stage of a sample pretreatment system is taken out according to an embodiment of the present invention, and FIG. 10 is a perspective view showing a module holder of a sample pretreatment system according to an embodiment of the present invention. FIG. 11 is a perspective view showing a state in which the holder stage of the sample pretreatment system is taken out according to the embodiment of the present invention, and FIG. 12 is a perspective view showing the state in which a holder stage of a sample pretreatment system is contained according to an embodiment of the present invention.

By referring to FIG. 1 to FIG. 12, a sample pretreatment system 1000 according to an embodiment of the present invention may comprise a holder storage unit 500 having a module holder 520 on which the aforementioned sample pretreatment module 100 is seated, a cartridge accommodating portion 400 in which a cartridge (not shown) is loaded as the sample accommodated in a chamber 112 of the sample pretreatment module 100 is discharged and a magnetic force generating unit 300 for generating a magnetic force to rotate the permanent magnet 132 provided in the sample pretreatment module 100, and a penetration and discharge execution unit 120 for having the penetration membrane 116 of the sample pretreatment module 100 penetrated and discharging the sample by pressing the moving unit 124 of the cap 120.

The holder storage unit 500 performs a role of loading the sample pretreatment module 100 containing the sample to be pretreated into the sample pretreatment system 1000. As illustrated in FIG. 8, the sample pretreatment system 1000 shows its internal structure, but a cover (not shown) for covering the outside of the sample pretreatment system 1000 may be provided.

In detail, the holder storage unit 500 is provided with a module holder 520 on which the sample pretreatment module 100 is mounted as described above. The module holder 520 is installed on a holder stage 530. The holder stage 530 is movable so that the module holder 520 can be moved to a loading or unloading position.

A fourth motor 510 may be provided on one side of the holder stage 530 to provide a driving force for moving the holder stage 530 together with the module holder 520. The fourth motor 510 rotates a pinion gear 512 of the storage unit connected to the rotation shaft of the motor and the pinion gear 512 of the storage unit is engaged with a rack gear (not shown) provided below the holder stage 530 so as to move the holder stage 530 in the horizontal direction by converting the rotational motion into the horizontal motion.

Here, a guide rail 532 is provided under the holder stage 530 to guide the horizontal movement of the holder stage 530.

When the sample pretreatment module 100 is initially mounted, the fourth motor 510 is driven in one direction and the holder stage 530 slides on the guide rail 532 to be drawn out. At this time, a door (not shown) may be provided on the entire cover (not shown) of the sample pretreatment system 1000 so that the holder stage 530 can be taken in and out.

After the sample pretreatment module 100 is mounted on the module holder 520 of the holder stage 530 drawn out to the outside, the fourth motor 510 is driven again in the opposite direction so that the holder stage 530 is slid on the guide rail 532 to be housed inward.

This operation may be implemented by pressing a switch (not shown) provided outside.

The module holder 520 provided on the holder stage 530 forms a space having a substantially cylindrical shape inside so that the sample pretreatment module 100 can be seated therein. A module heater 524 for heating the sample pretreatment module 100 may be provided outside the module holder 520.

As shown in FIG. 10, the module heater 524 comprises a heat wire surrounding the outside of the holder body 522 and heats the sample pretreatment module 100 placed inside the holder body 522 by generating heat as current flows.

As described above, since the body 110 of the sample pretreatment module 100 according to the present embodiment is thin and has high heat transfer ability, it can absorb heat emitted from the module heater 524, and heat the sample to the desired temperature within a short time. At this time, the holder body 522 interposed between the module heater 524 and the sample pretreatment module 100 is also preferably made of a metallic material having a good thermal conductivity. As shown in FIG. 10, a heater cover 526 is installed outside the module heater 524.

The temperature and the holding time of the sample pretreatment module 100 may differ according to the types of samples and buffers to be preprocessed. For example, 49° C. for vitamin D is to be maintained for 10 minutes and 37° C. for Free T4 and testosterone are to be maintained for 5 minutes.

Meanwhile, the penetration and discharge execution unit 200 may comprise an edge pressing portion 220 for pressing the cap edge portion 129 (See FIGS. 18-19) of the sample pretreatment module 100 so as to penetrate the penetration membrane 116 in the sample pretreatment module 100, and a moving-unit pressing portion 230 for pressing the moving unit 124 to discharge the sample.

As the name implies, the penetration and discharge execution unit 200 performs both the role of penetrating the penetration membrane 116 of the sample pretreatment module 100 described above and pressing the sample to have the sample discharged.

As described above, the amount of the sample to be discharged depends on the moving distance and the speed of the moving unit 124 of the sample pretreatment module 100. The moving unit 124 is pressed through the moving-unit pressing portion 230 with constant speed and distance, thereby, keeping the discharged amount constant as a fixed amount.

The magnetic force generating unit 300 may be provided at one side of the module holder 520 to generate a magnetic force to rotate the permanent magnet 132 provided in the sample pretreatment module 100.

In addition, the magnetic force generating unit 300 comprises a vortexing magnet 320 rotatably installed on one side of the module holder 520, and a second motor 310 for rotating the vortexing magnet 320.

The cartridge accommodating portion 400 performs a role of loading or unloading a cartridge (not shown) into which the pretreated sample is put, and has a third motor 410 for providing a driving force for loading or unloading.

Figure 13:
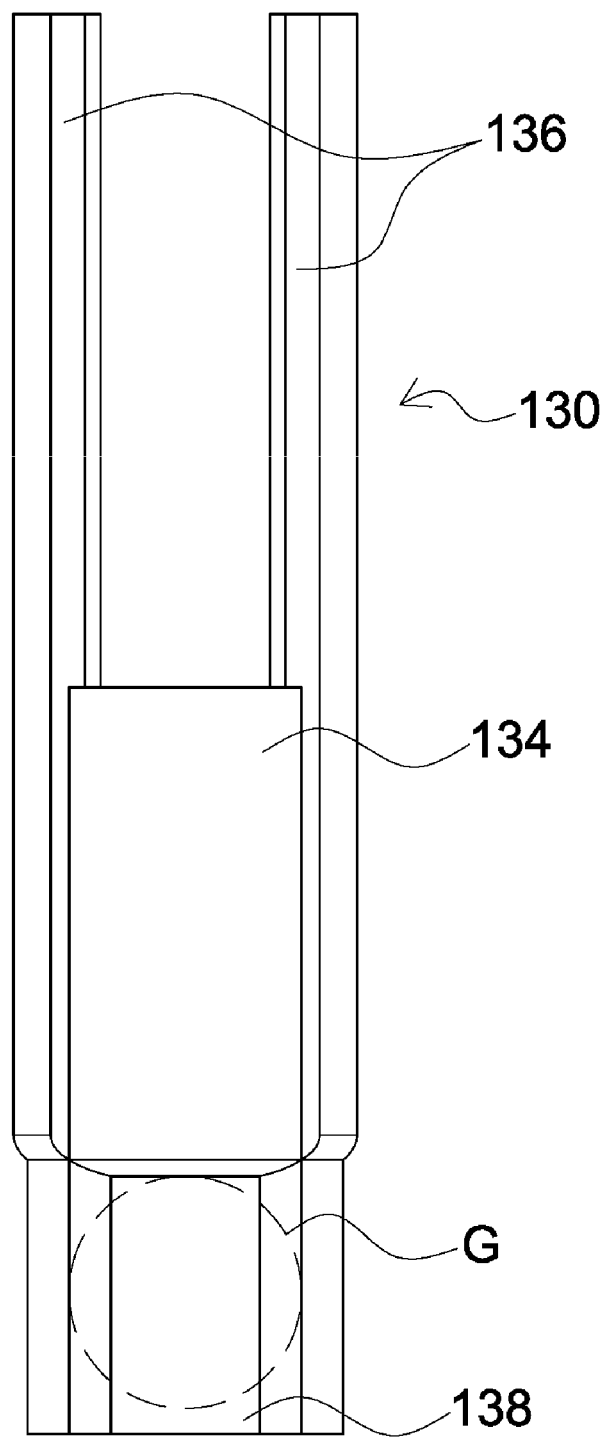
FIG. 13 is a view illustrating a process of dotting and drying gold nanoparticles on a dotting substrate of a sample pretreatment module according to an embodiment of the present invention.
Figure 14:
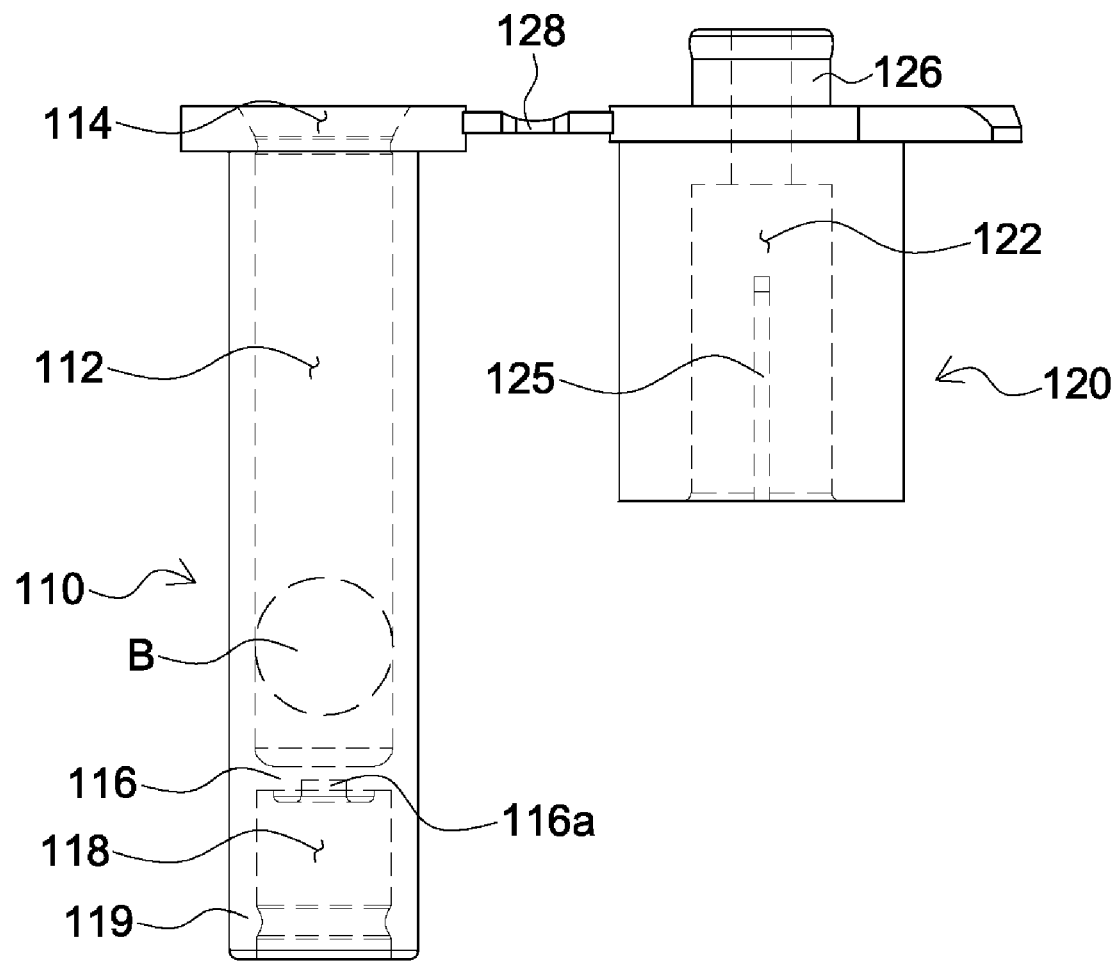
FIG. 14 is a view illustrating a process of dotting and drying a buffer in a chamber of a sample pretreatment module according to an embodiment of the present invention.
Figure 15:
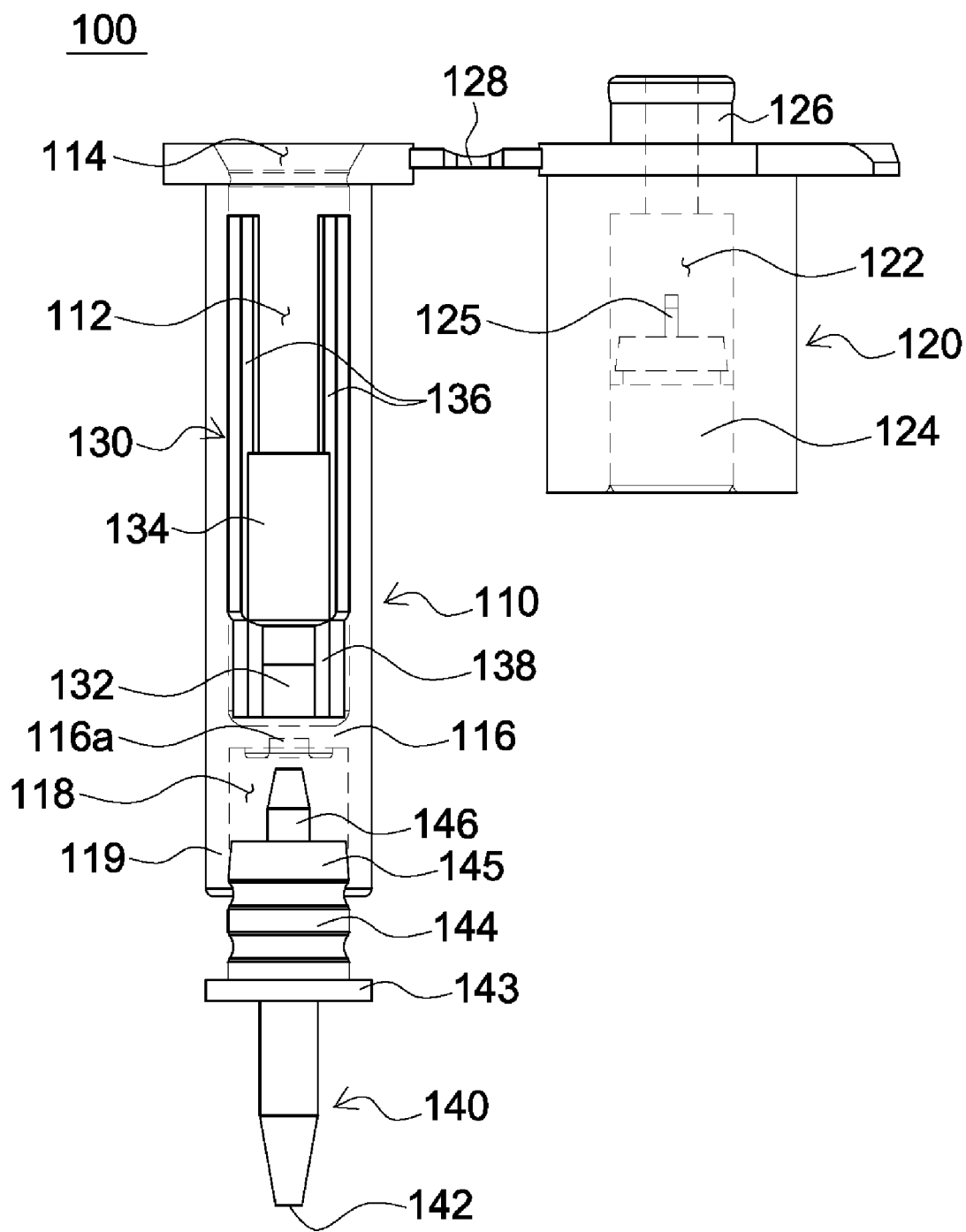
FIG. 15 is a diagram showing a state in which each part of a sample pretreatment module is assembled according to an embodiment of the present invention.
Figure 16:
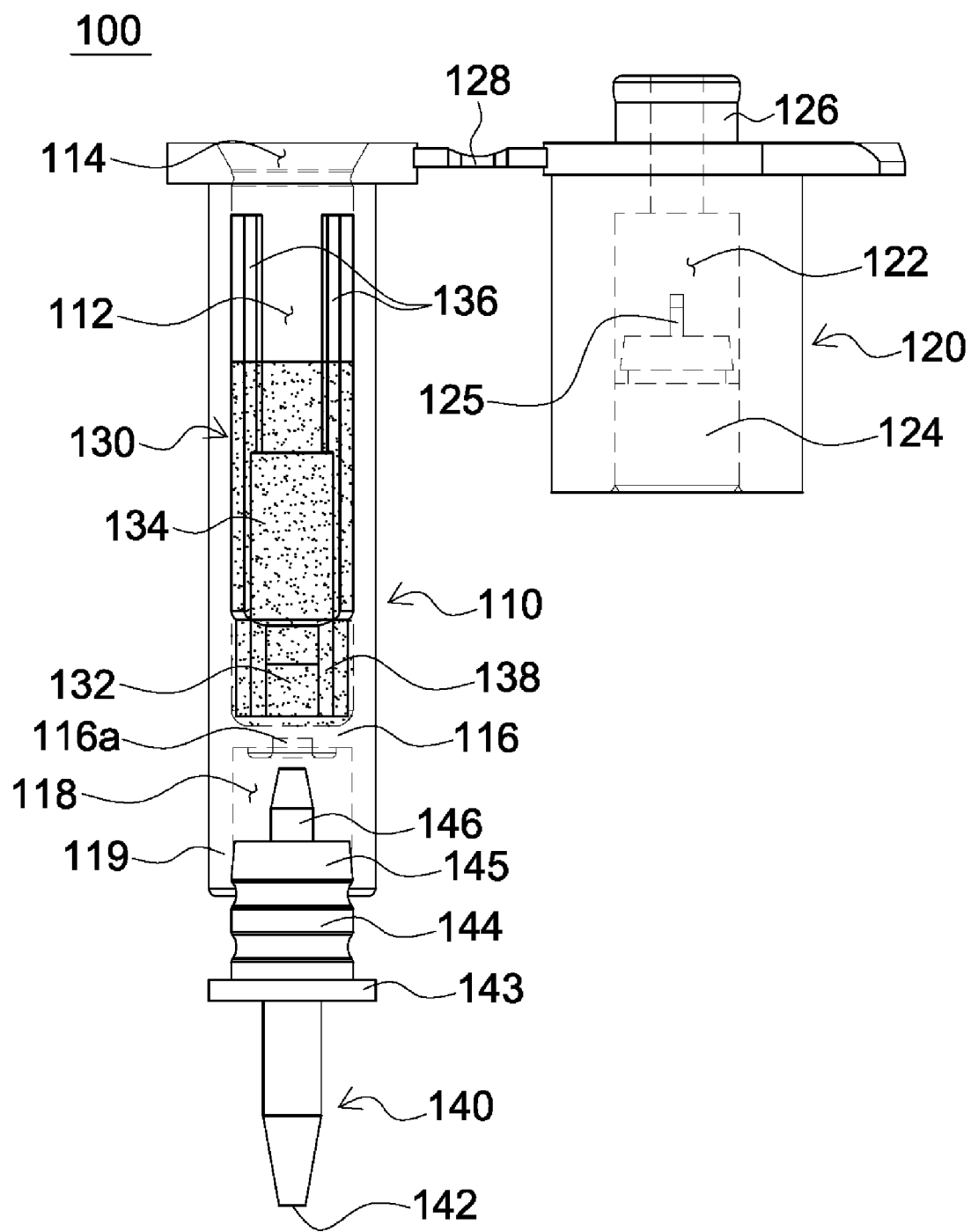
FIG. 16 is a view showing a state in which a sample is injected into a chamber of a sample pretreatment module according to an embodiment of the present invention.
Figure 17:
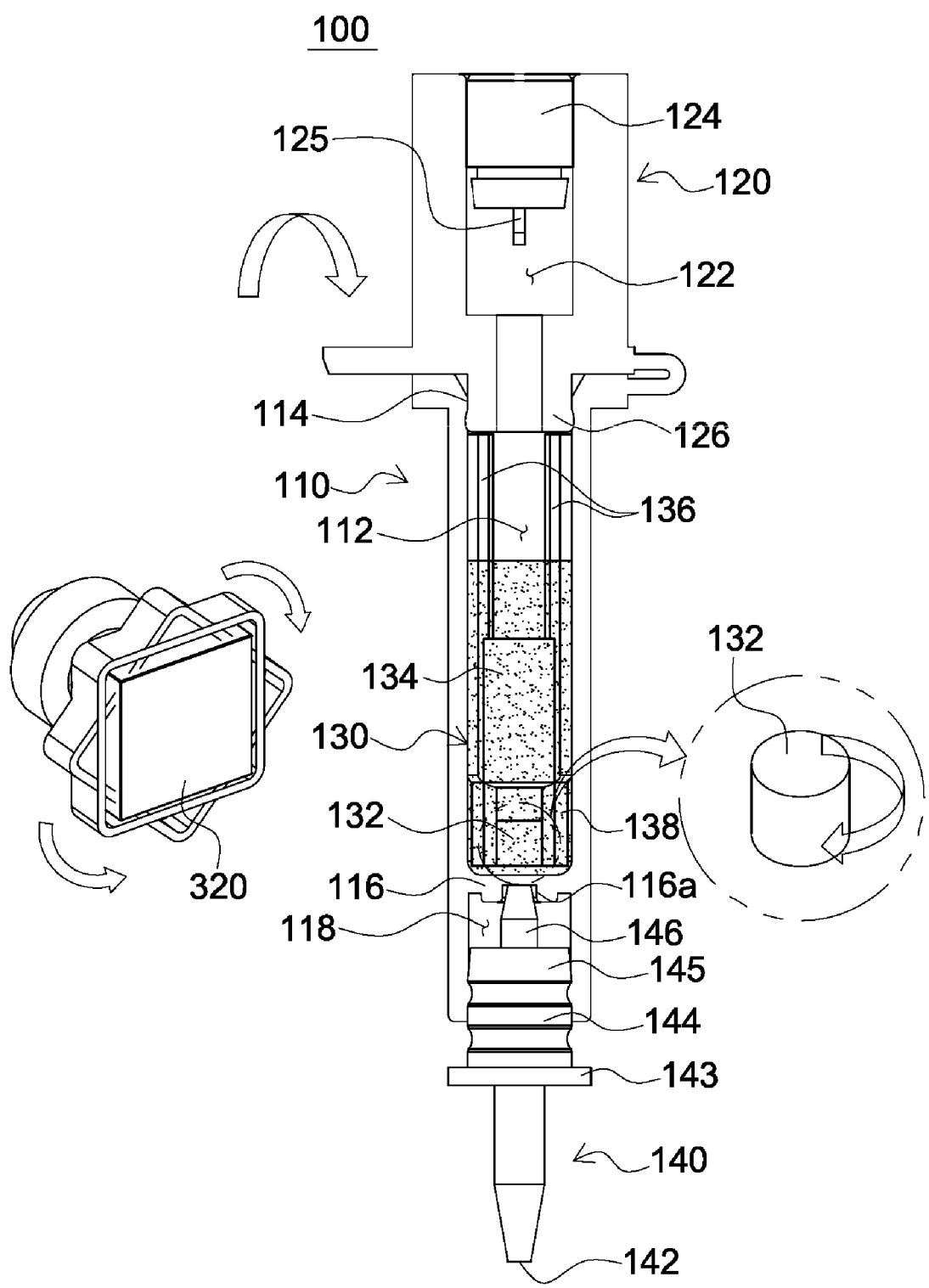
FIG. 17 is a diagram illustrating a process of mixing a sample by applying magnetic force to a permanent magnet of a sample pretreatment module according to an embodiment of the present invention.
Figure 18:
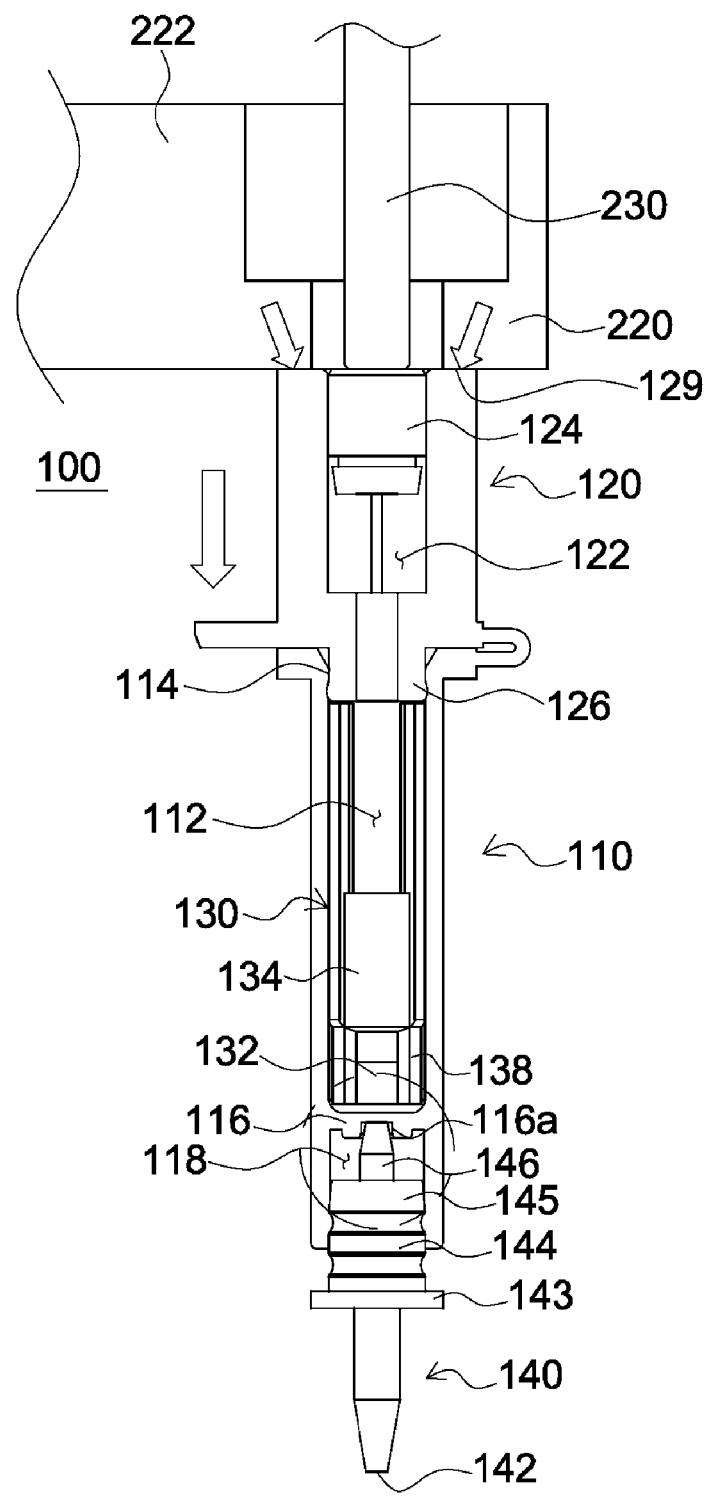
FIG. 18 is a view showing a process of penetrating a penetration membrane by pressing a cap edge portion of a sample pretreatment module according to an embodiment of the present invention.
Figure 19:
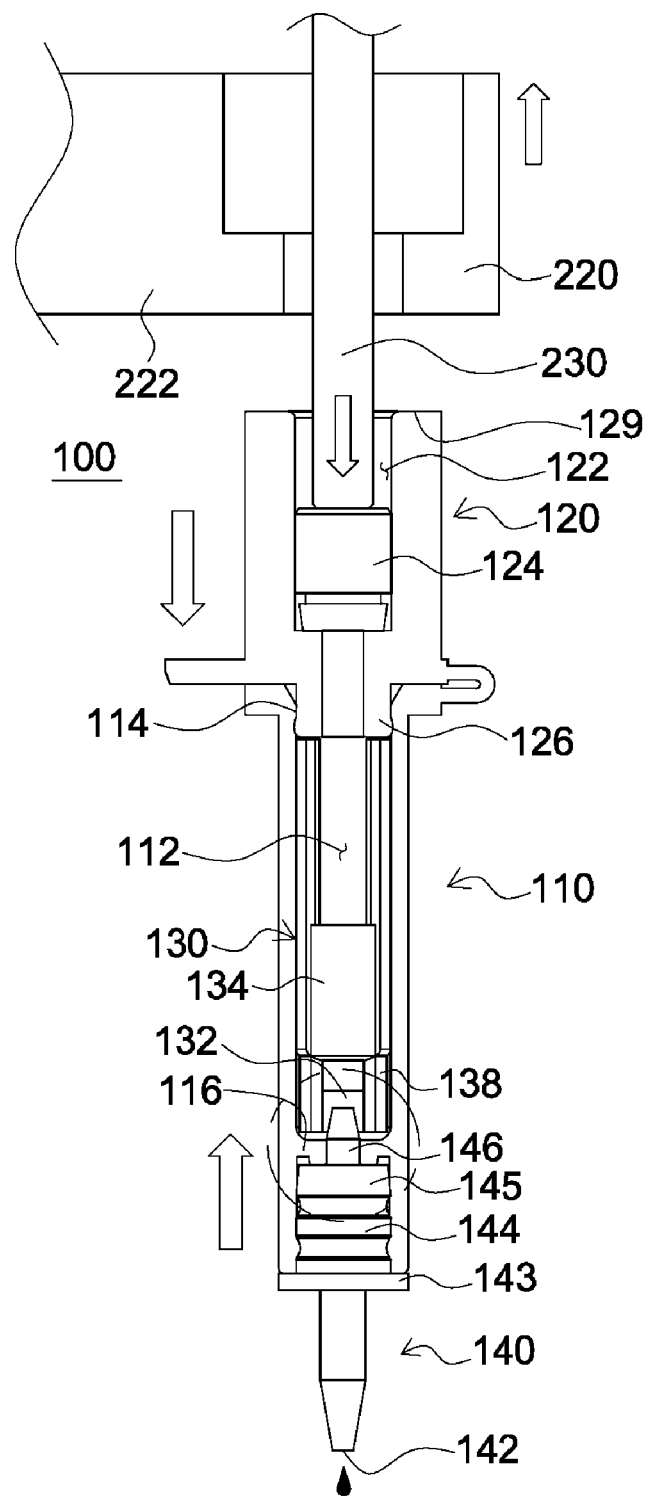
FIG. 19 is a view illustrating a process of discharging a sample by pressing a moving unit of a sample pretreatment module cap according to an embodiment of the present invention.

FIG. 13 is a view illustrating a process of dotting and drying gold nanoparticles on a dotting substrate of a sample pretreatment module according to an embodiment of the present invention, FIG. 14 is a view illustrating a process of dotting and drying a buffer in a chamber of a sample pretreatment module according to an embodiment of the present invention, FIG. 15 is a diagram showing a state in which each part of a sample pretreatment module is assembled according to an embodiment of the present invention, FIG. 16 is a view showing a state in which a sample is injected into a chamber of a sample pretreatment module according to an embodiment of the present invention, FIG. 17 is a diagram illustrating a process of mixing a sample by applying magnetic force to a permanent magnet of a sample pretreatment module according to an embodiment of the present invention, FIG. 18 is a view showing a process of penetrating a penetration membrane by pressing a cap edge portion of a sample pretreatment module according to an embodiment of the present invention, and FIG. 19 is a view illustrating a process of discharging a sample by pressing a moving unit of a sample pretreatment module cap according to an embodiment of the present invention.

As shown in FIGS. 8-19, a sample pretreatment process through the sample pretreatment module 100 according to an exemplary embodiment of the present invention is shown as follows.

First, as shown in FIG. 13, an additional sample is dotted on the second extension portion 138 of the dotting substrate 130 to be inserted into the sample pretreatment module 100. In this embodiment, the gold nanoparticle (G) is dotted and dried on the second extension portion 138.

Next, as shown in FIG. 14, a release buffer (B) is dotted and dried on the penetration membrane 116 in the chamber 112. At this time, vitamin D can be used as a buffer in a vitamin D mode.

Then, each part of the sample pretreatment module 100 is assembled as shown in FIG.15. That is, the permanent magnet 132 and the dotting substrate 130 are disposed in the chamber 112 and the discharge tip 140 is coupled to the body 110. At this time, the discharge tip 140 is partially inserted so that the penetration portion 146 does not penetrate the penetration membrane 116. The moving unit 124 is inserted into the hollow portion 122 of the cap 120.

As shown in FIG. 16, after the sample is injected into the chamber 112 and then the cap 120 is closed, the sample pretreatment module 100 is loaded on the module holder 520 of the sample pretreatment system 1000.

When the sample pretreatment module 100 is loaded on the sample pretreatment system 1000 as described above and then the vortexing magnet 320 is rotated as shown in FIG. 17, a magnetic force causes the permanent magnet 132 to rotate, thereby, mixing the sample.

For example, in the case of the vitamin D mode, the sample is heated by heating the sample at 49° C. for about 10 minutes while the module heater 524 is heated for about 5 minutes at Free T4 and testosterone at 37° C.

When the pretreatment is completed as described above, the rim pressing part 220 pushes the cap edge portion 129 downward to penetrate the penetration membrane 116, as shown in FIG. 19, the moving-unit pressing portion 230 moves downward and presses the moving part 124 located in the hollow part 122 of the cap 120, as shown in FIG. 19.

When the moving unit 124 moves downward to pressurize, the sample in the chamber 112 is discharged through the discharging portion 142 in a fixed amount. At this time, the moving unit 124 is pressed by the moving-unit pressing portion 230 with constant speed and distance, thereby, keeping the discharged amount constant as a fixed amount.

The discharged sample is dropped on a cartridge (not shown) for fluid analysis located at the lower portion and used for diagnosis and analysis.

Table 1 and Table 2 show the results of the actual pretreatment and the quantitative discharge test using the sample pretreatment module 100 of the present invention under the condition in which plasma and gold particles are mixed and maintained at 37° C. for 5 minutes.

The test was conducted in the following process for both TABLE 1 and TABLE 2.

(1). 5 ul of gold particles are to be dotted and dried on the dotting substrate.

(2). Let the dotting substrate of (1) be inserted into the module.

(3). Let 70 ul of plasma be taken out using a pipette (Reference 2, eppendorf) and injected into the module of (2).

(4). Let the module of (3) be inserted into the pretreatment system apparatus.

(5). Let the module of (4) be heated at 37° C. for 5 minutes in the pretreatment system apparatus.

(6). Let the gold particles and the plasma be mixed for 30 seconds in the magnet stirring manner while (5) is performed.

(7). Let 3 drops of the heated solution from (6) be discharged at the fixed amount.

(8). After confirming the discharge of 3 drops, measure the volume with an electronic balance (ME204, METTLER TOLEDO).

TABLE 1

|  | drop | volume (ul) |
| --- | --- | --- |
| Sample-1 | 3 | 35 |
| Sample-2 | 3 | 35 |
| Sample-3 | 3 | 33 |
| Sample-4 | 3 | 33 |
| Sample-5 | 3 | 35 |
| Sample-6 | 3 | 35 |
| Sample-7 | 3 | 35 |
| Sample-8 | 3 | 35 |
| Sample-9 | 3 | 33 |
| Sample-10 | 3 | 35 |
| Drop volume Ave. |  | 34.40 |
| Standard deviation |  | 0.9661 |
| CV % |  | 2.81 |

TABLE 2

|  | drop | volume (ul) |
| --- | --- | --- |
| Sample-1 | 3 | 33 |
| Sample-2 | 3 | 33 |
| Sample-3 | 3 | 33 |
| Sample-4 | 3 | 32 |
| Sample-5 | 3 | 33 |
| Sample-6 | 3 | 34 |
| Sample-7 | 3 | 34 |
| Sample-8 | 3 | 33 |
| Sample-9 | 3 | 34 |
| Sample-10 | 3 | 35 |
| Drop volume Ave. |  | 33.40 |

TABLE 2-continued

|  | drop volume (ul) |
| --- | --- |
| Standard deviation | 0.8433 |
| CV % | 2.52 |

As shown in Table 1 and Table 2, it can be confirmed that the discharge amount is maintained at a substantially constant level despite the discharged amount is in micro unit, and the standard deviation is less than 1.

The sample pretreatment module according to the embodiments of the present invention described so far can minimize the errors that may occur when the operator manually proceeds, and ensure accuracy and uniformity in the pretreatment and test results of the sample. Accordingly, mixing and discharging of the sample can be performed easily, thereby, enhancing the convenience of the operation and providing a user-friendly experimental environment.

The pressure in the chamber can be uniformly maintained and adjusted so as to prevent the outpouring of the sample even in a sudden pressure change in the chamber and the sample can be heated to a desired temperature within a short time by increasing the heat transfer ability for the sample contained in the chamber, thereby, increasing mixing and reaction efficiency.

In addition, the mixing effect of the sample can be increased by using the magnetic force, the mechanical driving can be minimized, and the sample can be discharged after the pretreatment.

While the present invention has been particularly shown and described with reference to exemplary embodiments thereof, it will be understood by those of ordinary skill in the art that various changes may be made therein without departing from the spirit and scope of the invention as set forth in the following claims. It is therefore to be understood that the modified embodiments are included in the technical scope of the present invention if they basically include elements of the claims of the present invention.

The invention claimed is:

1. A module for pretreatment of sample comprising:
   a body having a chamber for accommodating a sample therein;
   a cap coupled to a first end of the body and including a hollow portion communicating with the chamber through a first side of the cap;
   a dotting substrate having at least one portion configured to be dotted with a reagent, and configured to be inserted into the chamber;
   a discharge tip movably coupled to a second end of the body for discharging the sample accommodated in the chamber therethrough;
   a permanent magnet provided to be inserted in the chamber and mix the sample by a rotation thereof in accordance with a change of a magnetic field externally applied thereto;
   a moving unit movably provided in the hollow portion of the cap, blocking up a second side of the cap opposite to the first side, and pressing the sample in the chamber according to a movement thereof by an external force applied thereto to discharge the sample to an outside through the discharge tip; and
   at least one venting line formed along an inner wall of the hollow portion of the cap, which is blocked by the moving unit, and configured to adjust a pressure in the chamber.

2. The module according to claim 1, wherein the dotting substrate comprises:
   a body of the dotting substrate;
   at least one first extension portion extending at a first side of the body of the dotting substrate; and
   at least one second extension portion extending a second side of the body of the dotting substrate.

3. The sample pretreatment module according to claim 1, wherein an entire length of the dotting substrate coincides with a length of the chamber.

4. The module according to claim 1, wherein the permanent magnet is magnetized in N—S or S—N along a vertical direction.

5. The module according to claim 1, further comprising:
   a penetration membrane interposed between the chamber and the discharge tip; and
   a penetration portion protruded from an end of the discharge tip toward the penetration membrane and forming a discharge flow passage for discharging the sample in the chamber by penetrating the penetration membrane as the discharge tip moves toward the chamber.

6. The module according to claim 5, further comprising:
   a penetration guide formed at the penetration membrane for letting the penetration portion pass through a predetermined position of the penetration membrane.

* * * * *